(12) United States Patent　　(10) Patent No.: US 12,103,339 B2
Iustin　　(45) Date of Patent: Oct. 1, 2024

(54) TIRE FITTING SYSTEM AND METHOD THEREIN FOR ASSISTING IN FITTING A WHEEL

(71) Applicant: VOLVO TRUCK CORPORATION, Gothenburg (SE)

(72) Inventor: Roman Iustin, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 39 days.

(21) Appl. No.: 18/178,936

(22) Filed: Mar. 6, 2023

(65) Prior Publication Data

US 2023/0286335 A1　Sep. 14, 2023

(30) Foreign Application Priority Data

Mar. 9, 2022　(EP) ..................................... 22161071

(51) Int. Cl.
　　*B60C 23/04*　　(2006.01)
(52) U.S. Cl.
　　CPC ...... *B60C 23/0415* (2013.01); *B60C 23/0447* (2013.01); *B60C 2200/06* (2013.01)
(58) Field of Classification Search
　　CPC ............ B60C 23/0415; B60C 23/0447; B60C 2200/06
　　See application file for complete search history.

(56) References Cited

U.S. PATENT DOCUMENTS

| | | | | |
|---|---|---|---|---|
| 7,404,427 B2 * | 7/2008 | Hillman | ................ | B60C 25/138 340/447 |
| 2002/0116992 A1 * | 8/2002 | Rickel | .................. | F16D 66/026 73/146 |
| 2004/0044450 A1 * | 3/2004 | Taguchi | .............. | B60C 23/0466 701/29.6 |
| 2004/0084517 A1 * | 5/2004 | Harm | .................. | B60C 23/0408 235/375 |
| 2004/0164140 A1 * | 8/2004 | Voeller | ................... | G07C 5/008 235/375 |
| 2006/0238356 A1 * | 10/2006 | Tucker | ................ | H01Q 1/2241 340/447 |
| 2007/0069877 A1 | 3/2007 | Fogelstrom | | |

(Continued)

FOREIGN PATENT DOCUMENTS

| | | |
|---|---|---|
| JP | 2003159918 A | 6/2003 |
| WO | 2012140367 A2 | 10/2012 |

OTHER PUBLICATIONS

Extended European Search Report in corresponding European Application No. 22161071.0 dated Sep. 6, 2022 (6 pages).

*Primary Examiner* — Hoi C Lau
(74) *Attorney, Agent, or Firm* — Venable LLP; Jeffri A. Kaminski

(57) ABSTRACT

A tire fitting system and a method therein for assisting in fitting a tire on a rim of a wheel prior to assembly of the wheel on a vehicle is provided. The tire fitting system comprising a processing circuitry configured to determine a location of a RFID tag on the tire of the wheel, determine a location for an air valve on the rim of the wheel, determine the distance between the location of the RFID tag and the location for the air valve on the rim, and provide instructions for aligning the tire on the rim based on the determined distance between the location of the RFID tag and the location for the air valve on the rim.

16 Claims, 4 Drawing Sheets

(56) References Cited

U.S. PATENT DOCUMENTS

| | | | |
|---|---|---|---|
| 2014/0368327 A1* | 12/2014 | Darrer | G06K 19/0708 340/447 |
| 2016/0129734 A1* | 5/2016 | Sinner | B60C 23/001 701/2 |
| 2016/0133067 A1* | 5/2016 | Sinner | G07C 5/0808 340/459 |
| 2020/0070597 A1 | 3/2020 | Noel et al. | |
| 2023/0286335 A1* | 9/2023 | Iustin | B60C 25/05 |

* cited by examiner

TIRE FITTING SYSTEM AND METHOD THEREIN FOR ASSISTING IN FITTING A WHEEL

TECHNICAL FIELD

Embodiments herein relate in general to tire fitting. In particular, embodiments herein relate to a tire fitting system and a method performed by a tire fitting system for assisting in fitting a tire on a rim of a wheel prior to assembly of the wheel on a vehicle. Further, the embodiments herein also relate to a computer program product for performing the method and computer program product carrier.

BACKGROUND

In vehicles today, in particular heavy-duty vehicles such as semi-trailer vehicles or trucks for cargo transport, one or more central electronic control units, ECUs, may be implemented on-board the vehicle in order to read and collect sensor readings from various different types of wireless wheel sensors on-board the vehicle. In some cases, tire sensors may be located in or on the tires or rims on the wheels of the vehicle. The sensor data transmitted from these tire sensors may comprise, for example, tire pressures, tire temperatures, tire deformations, the identities of the sensors, etc. These types of systems are conventionally referred to as Tire Pressure Monitoring Systems, TPMS, or Tire Health Systems, THS. These systems also normally employ radio frequency transmissions for transmitting its sensor data to, e.g. the ECU or external sensor data receivers. In additional to such TPMS/THS systems, each tire and/or rim of a wheel may also have one or more integrated or mounted Radio Frequency Identification, RFID, sensors, i.e. RFID tags, for enabling identification of the specific tire and/or specific rim of a wheel, which also employs radio frequency transmissions.

Hence, for each wheel, there may be a plurality of different wireless tire sensors and RFID sensors transmitting different sensor data. This, in combination with the fact that a vehicle, such as e.g. a heavy-duty vehicle plus trailer, may comprise up to 18 wheels or more, may lead to problems with interfering radio frequency transmissions when attempting to wirelessly read data from the wheel sensors, such as, tire sensors and RFID tags, in a non-ambiguous manner. Hence, there is a need to alleviate this intra-sensor interference.

SUMMARY

It is an object of embodiments herein to provide a tire fitting system and method therein, along with computer program products and carriers, for assisting in fitting a tire on a rim of a wheel prior to assembly of the wheel on a vehicle that seeks to mitigate, alleviate, or eliminate all or at least some of the above-discussed drawbacks of presently known solutions.

According to a first aspect of embodiments herein, the object is achieved by a method performed by a tire fitting system for assisting in fitting a tire on a rim of a wheel prior to assembly of the wheel on a vehicle. The method comprises determining a location of a Radio Frequency Identification, RFID, tag on the tire of the wheel. The method also comprise determining a location for an air valve on the rim of the wheel. The method further comprise the distance between the location of the RFID tag and the location for the air valve on the rim. Further, the method comprise providing instructions for aligning the tire on the rim based on the determined distance between the location of the RFID tag and the location for the air valve.

By determining the location of the RFID tag on the tire and the air valve location on the rim and aligning the tire on the rim based on the distance therein between, it may be ensured that tire and rim of the wheel are fitted such that the RFID tag of the tire is always located within a short distance from the air valve location on the rim. This is particularly advantageous when assembling two wheels close to each other on the same axle of the vehicle (also known as a twin axle or twin wheel assembly); this, because the two wheels of a twin wheel assembly are naturally assembled on the same axle such that the air valves of the two wheels are shifted about 180 degrees from each other in order to facilitate easy access to the air valves when inflating or pressurizing the tires. This means that the RFID tags of the tires of the wheels inherently also will have about 180 degrees separation. By ensuring a maximum distance, or at least close thereto, between the two RFID tags of the different tires in a twin wheel assembly, any inference or ambiguous sensor reading previously caused by close proximity of the RFID tags may be eliminated. Hence, an easier sensor reading of the RFID tags of the tires is enabled.

In some embodiments, the instructions may be provided to an automation system arranged to physically fit the tire on the rim of the wheel. This means, for example, that one or more robotic arms or mechanisms controlling the fitting of a tire on a rim of a wheel may receive control signals ensuring that they will always operate in a manner that aligns the RFID tag of the tire with the air valve location on the rim upon fitting a tire on a rim of a wheel.

Optionally, in some embodiments, the method may comprise displaying the instructions for aligning the tire on the rim of the wheel on a display. This means, for example, that a person fitting a tire on a rim, such as, e.g. an operator of the tire fitting system, may be guided in how to fit the tire on the rim in a manner that aligns the RFID tag of the tire with the air valve location on the rim during the fitting of the tire on the rim of the wheel. In this case, according to some embodiments, the method may comprise displaying the instructions for aligning the tire on the rim of the wheel on the display until the distance between the location of the RFID tag and the location for the air valve is at or below a determined threshold level. In this way, the person may advantageously be continuously guided until a correct alignment of the tire and the rim is achieved. Further, in some embodiments, the method may comprise displaying information indicating that the alignment of the tire on the rim of the wheel is complete on the display when the distance between the location of the RFID tag and the location for the air valve is at or below the determined threshold level. This will provide an advantageous confirmation to the person fitting the tire on the rim that a correct alignment of the tire and the rim has been achieved.

According to some embodiments, the method may further comprise determining the location of the RFID tag on the tire of the wheel by performing image processing on images of the tire from the optical camera or by using an RFID scanning apparatus. The first option may be advantageous in cases when there is a visible imprint or print on the tire indicating the location of the RFID tag in the tire, while the latter option may be advantageous in cases where no visible imprint or print on the tire exist indicating the location for the RFID tag on the tire. Optionally, according to some embodiments, the method may further comprise determining the location for an air valve on the rim of the wheel by performing image processing on images of the rim from an optical camera or by using a tire sensor receiver. The first option may be advantageous in cases when there is no existing information regarding the location for an air valve on the rim of the wheel, while the latter option may be advantageous in cases when it is defined that a tire sensor is always located at the location for an air valve on the rim of the wheel.

According to a second aspect of embodiments herein, the object is achieved by a tire fitting system for fitting a tire on a rim of a wheel prior to assembly of the wheel on a vehicle. The tire fitting system comprise a processing circuitry configured determine a location of a RFID tag on the tire of the wheel. The processing circuitry is also configured to determine a location for an air valve on the rim of the wheel. The processing circuitry is further configured to determine the distance between the RFID tag and the location for the air valve on the rim. Furthermore, the processing circuitry is configured to provide instructions for aligning the tire on the rim based on the determined distance between the RFID tag and the location for the air valve on the rim.

In some embodiments, the processing circuitry may further be configured to provide the instructions to an automation system arranged to physically fit the tire on the rim of the wheel. Optionally, in some embodiments, the processing circuitry may further be configured to display the instructions for aligning the tire on the rim on a display. In this case, according to some embodiments, the processing circuitry may further be configured to display the instructions for aligning the tire on the rim of the wheel on the display until the distance between the location of the RFID tag and the location for the air valve is at or below a determined threshold level. Further, in some embodiments, the processing circuitry may be configured to display information indicating that the alignment of the tire on the rim of the wheel is complete on the display when the distance between the location of the RFID tag and the location for the air valve is at or below the determined threshold level.

According to some embodiments, the processing circuitry may be further configured to determine the location of the RFID tag on the tire of the wheel by performing image processing on images of the tire from the optical camera or by using an RFID scanning apparatus or by using a tire sensor receiver. Optionally, according to some embodiments, the processing circuitry may be further configured to determine the location for an air valve on the rim of the wheel by performing image processing on images of the rim from an optical camera or by using a tire sensor receiver.

According to a third aspect of the embodiments herein, the object is achieved by a computer program comprising instructions which, when executed in a processing circuitry, cause the processing circuitry to carry out the methods described above. According to a fourth aspect of the embodiments herein, the object is achieved by a carrier containing any of the computer program products described above, wherein the carrier is one of an electronic signal, optical signal, radio signal, or computer-readable storage medium.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
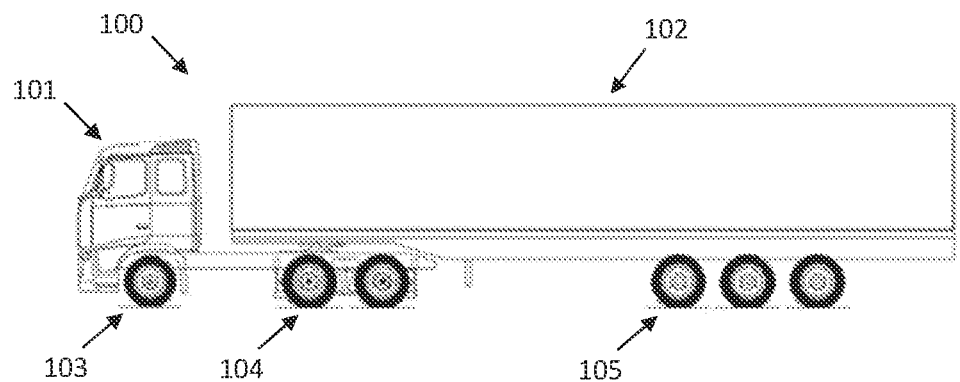
FIG. 1 is a side view of a vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description. It is to be understood that the present invention is not limited to the embodiments described herein and illustrated in the drawings; rather, the skilled person will recognize that many changes and modifications may be made within the scope of the appended claims.

FIG. 1 illustrates an example of a vehicle 100. In this case, the vehicle 100 is exemplified as a heavy-duty vehicle combination for cargo transport. The vehicle 100 in FIG. 1 comprises a truck or towing vehicle 101 configured to tow a trailer unit 102 in a known manner, e.g., by a fifth wheel connection. The vehicle 100 comprises wheels 103, 104, and 105. Herein, a heavy-duty vehicle is taken to be a vehicle designed for the handling and transport of heavier objects or large quantities of cargo. As an example, a heavy-duty vehicle could be a semi-trailer vehicle, or a truck as described above. As another example, a heavy-duty vehicle could be a vehicle designed for use in construction, mining operations, and the like. It is appreciated that the techniques and devices disclosed herein can be applied together with a wide variety of electrically powered vehicle units, not just those exemplified in FIG. 1. Thus, the techniques disclosed herein are also applicable to, e.g., rigid trucks and also multi-trailer electric heavy-duty vehicles comprising one or more dolly vehicle units. Thus, even though the embodiments herein are described mainly with respect to heavy-duty vehicles, such as, e.g. semi-trailer vehicles or trucks for cargo transport, the embodiments herein should not be considered restricted to this particular type of vehicle but may also be used in other types of vehicles.

Figure 2:
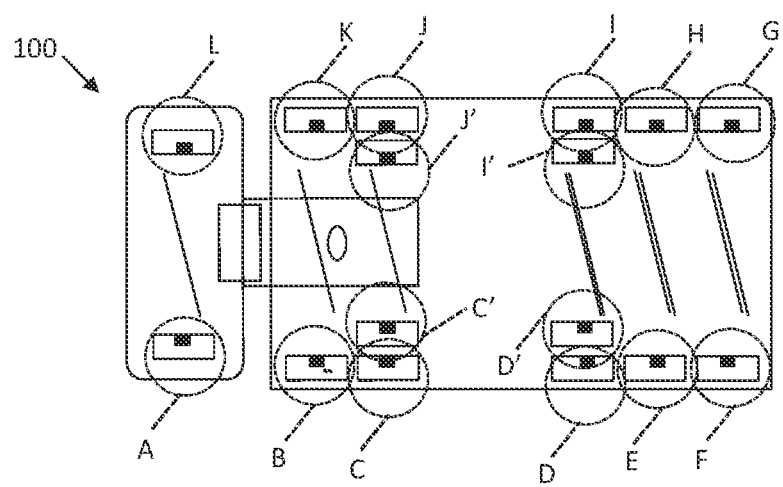
FIG. 2 is a schematic illustration of a vehicle and wheel locations thereon.

FIG. 2 illustrates a first top-side view of the vehicle 100 and wheel positions A-L thereon. In this example, the wheel position A is the front left wheel position of the truck or towing vehicle 101 of the vehicle 100, while the wheel position L is the front right wheel position of the truck or towing vehicle 101 of the vehicle 100. Furthermore, the wheel positions of the trailer unit 102 ranges around the trailer unit 102 from the wheel position B for the front left wheel of the trailer unit 102 to the wheel position K of the front right wheel of the trailer unit 102. In some cases, certain wheel positions may comprise a set of twin wheels as illustrated for the wheel positions C, D, I, and J. In this case, the outermost wheel position of the set of twin wheels is referred to as C, D, I, and J, respectively, while the innermost wheel position of the set of twin wheels is referred to as C', D', I', and J'. It should also be noted that the notation of the wheel positions is merely made for sake of illustrative purposes to provide a clear and concise references to different wheel positions; in other words, this notation should not be construed as limiting to the embodiments herein.

Figure 3:
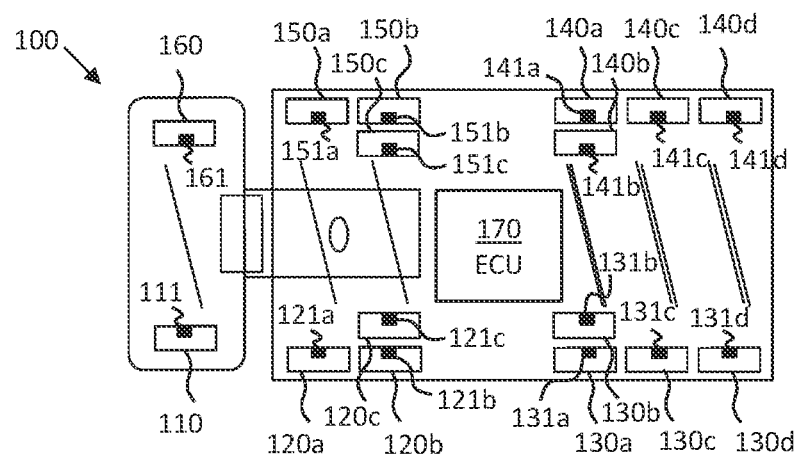
FIG. 3 is a schematic illustrations of a vehicle having tires with tire sensors at each wheel location.

FIG. 3 illustrates a second top-side view of the vehicle 100 having wheels 110, 120, 130, 140, 150, 160 comprising tire sensors 111, 121, 131, 141, 151, 161 at each tire position A-L on the vehicle 100 as described above in FIG. 2. The vehicle 100 further comprise an electronic control unit, ECU 170.

In this example, the wheel 110 at the wheel position A of the truck or towing vehicle 101 of the vehicle 100 comprise at least one tire sensor 111, while the wheel 120 at the wheel position L of the truck or towing vehicle 101 of the vehicle 100 comprise at least one tire sensor 121. Similarly, each wheel 120a, 120b, 120c at the two front left wheel positions B, C, C' of the trailer unit 102 of the vehicle 100 comprise each at least one tire sensor 121a, 121b, 121c, respectively. Also, each wheel 130a, 130b, 130c, 130d at the three back left wheel positions D, D', E, F of the trailer unit 102 of the vehicle 100 comprise each at least one tire sensor 131a, 131b, 131c, 131d, respectively. Furthermore, each wheel 140a, 140b, 140c, 140d at the three back right wheel positions I, I', H, G of the trailer unit 102 of the vehicle 100 comprise each at least one tire sensor 141a, 141b, 141c. Lastly, each wheel 150a, 150b, 150c at the two front right wheel positions K, J, J' of the trailer unit 102 of the vehicle 100 comprise each at least one tire sensor 151a, 151b, 151c.

The ECU 170 and each of the one or more tire sensors 111, 121, 131, 141, 151, 161 on the vehicle 100 may be part of an on-board Tire Pressure Monitor System/Tire Health System, TPMS/THS. In other words, the one or more tire sensors 111, 121, 131, 141, 151, 161 on the vehicle 100 may be TPMS/THS sensors, and the ECU 170 may be a TPMS/THS sensor reader. The one or more tire sensors 111, 121, 131, 141, 151, 161 on the vehicle 100 may also be referred to as TPMS/THS transponders.

Furthermore, each tire and/or rim of each of the wheels 110, 120, 130, 140, 150, 160 may also have one or more integrated or mounted Radio Frequency Identification, RFID, sensor, i.e. RFID tag. The RFID tags (not shown) enable identification of the specific tire and/or specific rim of each of the wheels 110, 120, 130, 140, 150, 160 using radio frequency transmissions.

As part of the developing of the embodiments described herein, it has been realized that there may be instances where it will be difficult to perform a wireless reading of an RFID tag in a tire of a wheel due to close proximity to another RFID tag in a tire of another wheel. One example of such an instance is illustrated in FIG. 4.

Figure 4:
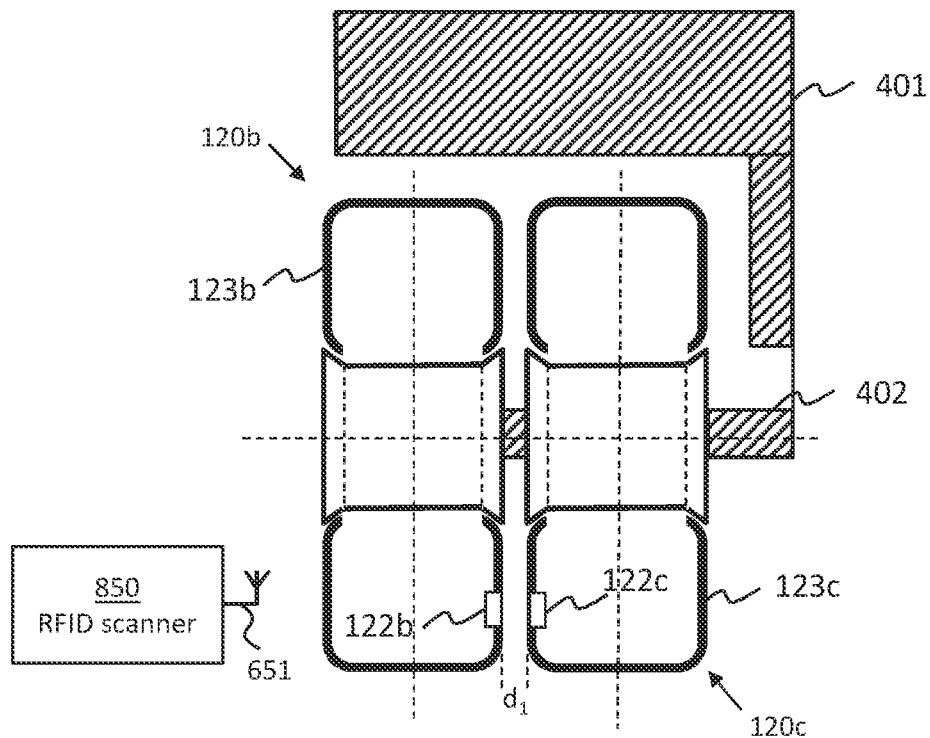
FIG. 4 is a schematic illustration of a twin wheel assembly on a vehicle.

FIG. 4 shows a so-called twin axle or twin wheel assembly on the vehicle 100. This means that two wheels, e.g. wheels 120b, 120c of vehicle 100, are assembled next to one another on the same side of the vehicle 100 and on the same axle 402 in the wheel housing 401 of the vehicle 100. After assembly of the wheels 120b, 120c on the axle 402, an RFID tag 122b in the tire 123b of the outer wheel 120b may unfortunately happen to be located within close proximity of an RFID tag 122c in the tire 123c of the inner wheel 120c. This means that the distance di between the RFID tags 122b, 123b is below a certain distance such that an RFID scanner 602 may experience interference from the RFID tag 122b in the tire 123b upon attempting to read the RFID tag 122c in the tire 123c. Hence, it may be difficult for the RFID scanner 602 to clearly and unambiguous determine which of the RFID tags 122b, 123b belong to which tire 123b, 123c. Even if the RFID scanner 602 comprise multiple different RFID receivers or antennas and/or is located below the tires 123b, 123c, the distance dl may still be too short for the RFID scanner 602 to be able to determine which of the RFID tags 122b, 123b belong to which tire 123b, 123c. However, by utilizing the fact that twin wheels are naturally assembled on the same axle such that the air valves of the two wheels are shifted about 180 degrees from each other, which is performed in order to facilitate easy access to the air valves when inflating or pressurizing the tires of the wheels once assembled on the vehicle, a tire fitting system and method therein is provided according to the embodiments described herein which utilizes this fact and addresses this issue.

Figure 5:
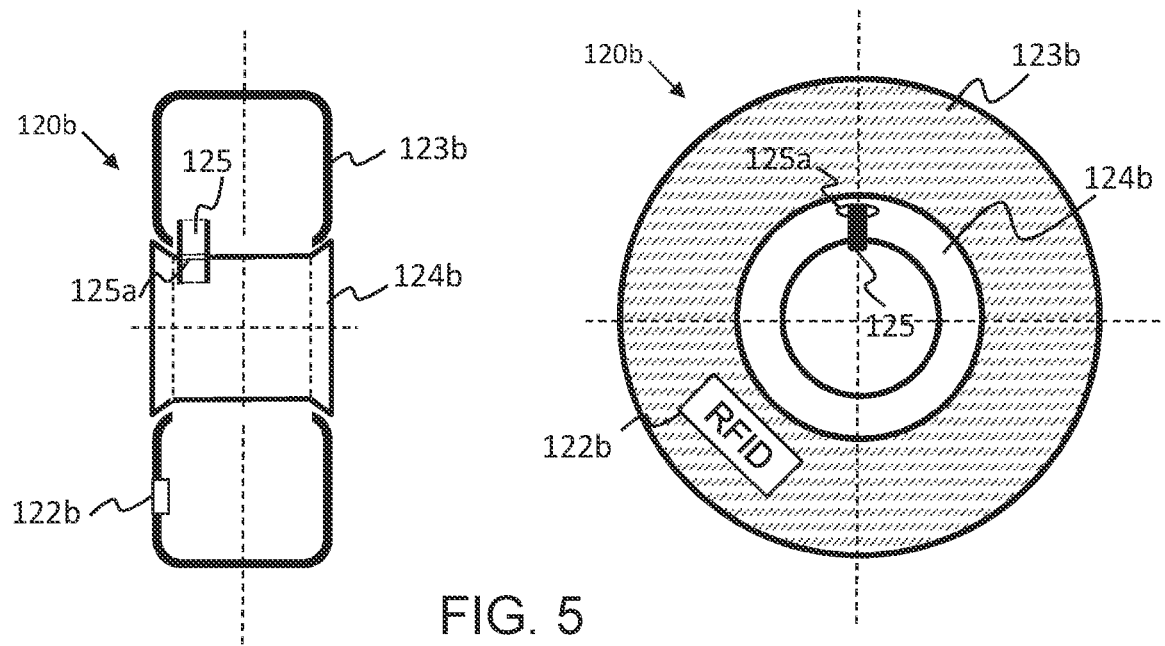
FIG. 5 is a cross-section and side view of a wheel.

FIG. 5 shows a cross-section (left) and side view (right) of a wheel 120b. The wheel 120b comprise a tire 123b that has been fitted on a rim 124b. The rim 124b comprise an opening 125a for an air valve 125 for use when inflating or pressurizing the tire 123b on the rim 124b. This opening 125a may serve as and be identified as a location for the air valve 125. Normally, after fitting the tire 123b on a rim 124b, the RFID tag 122b of the tire 123b may be located anywhere on the wheel 120b in relation to the opening 125a for the air valve 125 on the rim 124b. The RFID tag 122b is integrated or mounted in the tire 123b prior to the fitting on the rim 124b. The tire 123b may also comprise a visual marker or indicator on the outside of the tire 123b indicating the location of the RFID tag 122b in the tire 123b.

Figure 6:
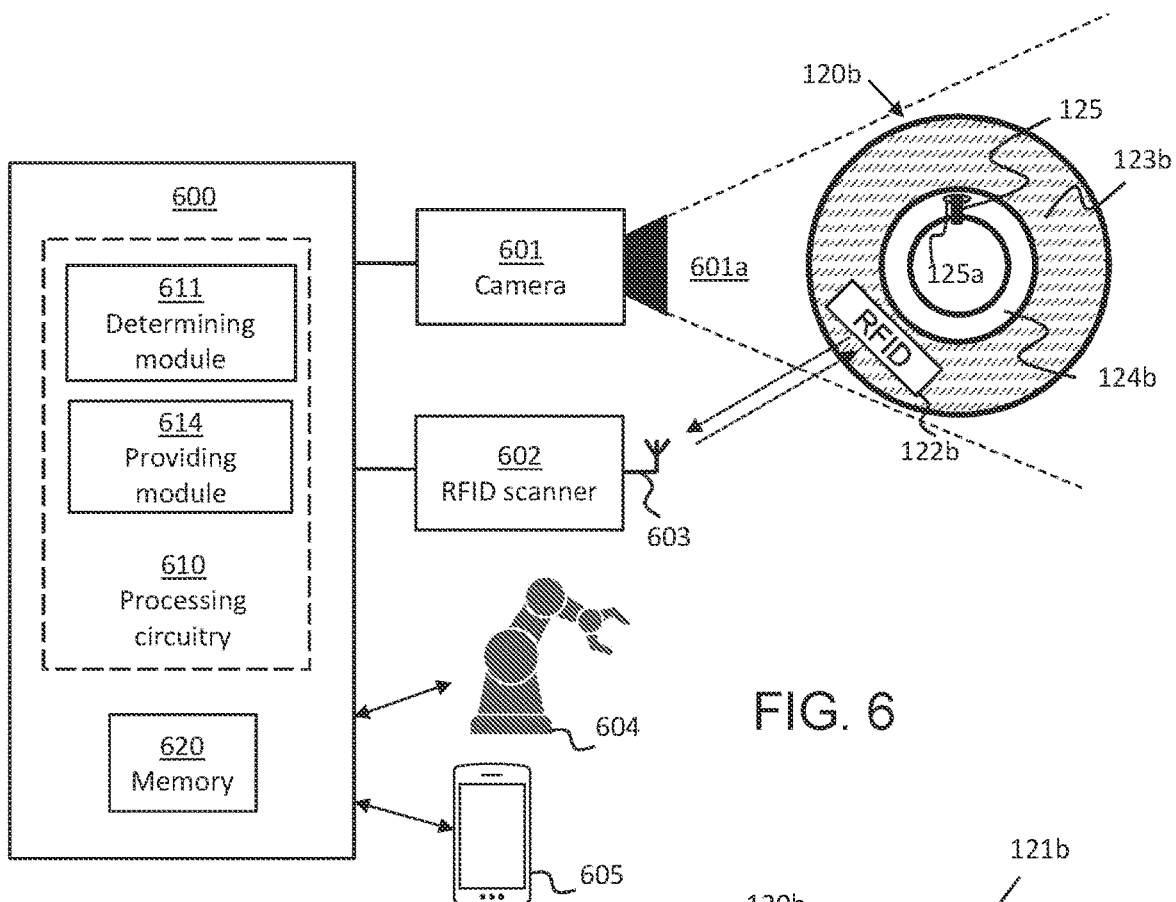
FIGS. 6-7 are schematic illustrations of a tire fitting system according to some embodiments.
Figure 7:
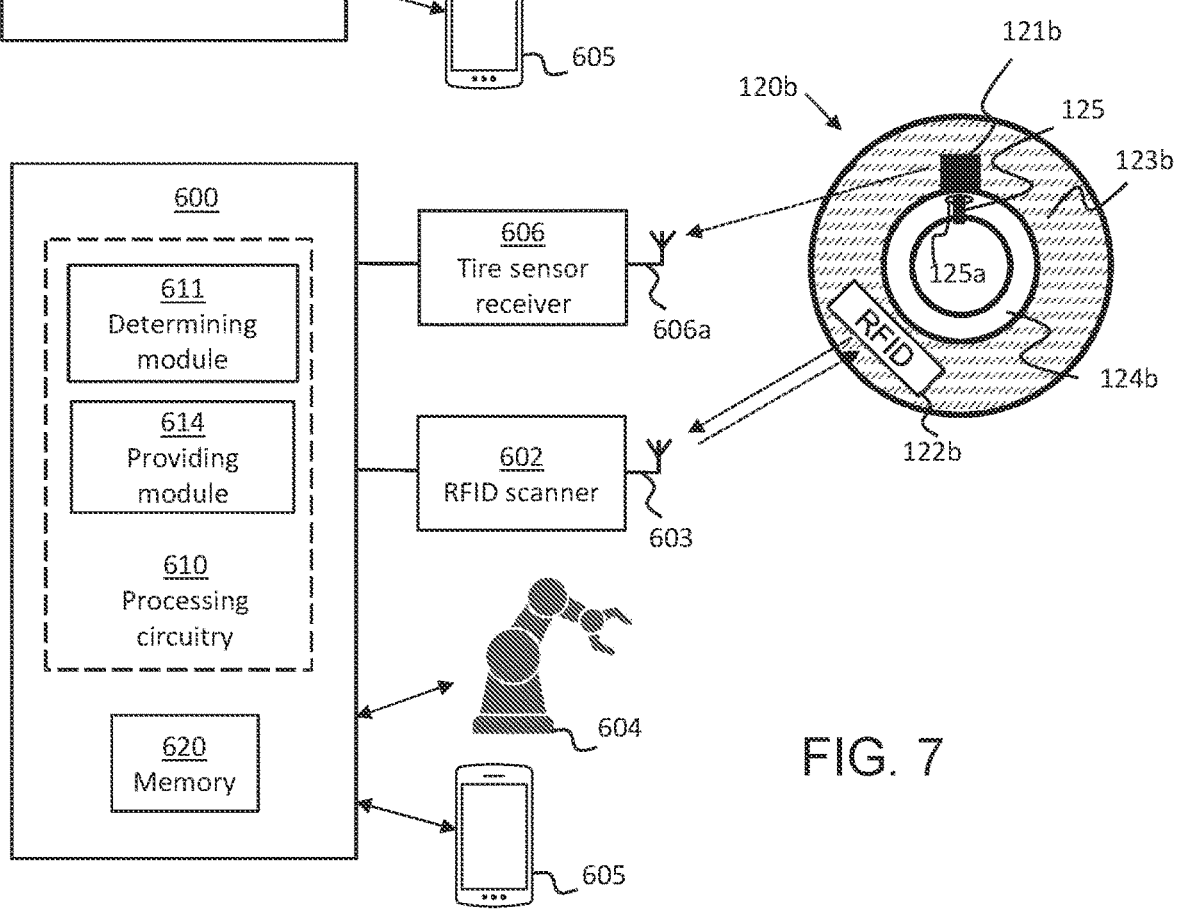

FIGS. 6-7 shows a schematic illustration of a tire fitting system 600 for assisting in fitting a tire 123b on a rim 124b of a wheel 120b prior to assembly of the wheel 120b on a vehicle 100 according to some embodiments. It should be noted that, although not shown in FIG. 6, known conventional features of the tire fitting system 600, such as, for example, a power source, e.g. a battery or main connection, may be assumed to be comprised in the tire fitting system 600.

According to the embodiments shown in FIG. 6, the tire fitting system 600 may comprise, be arranged to be connected to, or be configured to communicate with an optical camera 601. The optical camera 601 is preferably arranged so that its field of view 601a is able to capture images of the tire 123b and the rim 124b during the fitting of the tire 123b onto the rim 124b. While the images may, for example, capture a side-view of the tire 123b and the rim 124b as shown in FIG. 6 or similar, one important is that the field of view 601a of the optical camera 601 also capture the location for the air valve 125 on the rim 124b, e.g. the opening 125a. Also, in case the tire 123b comprise a visual marker or indicator on the outside of the tire 123b indicating the location of the RFID tag 122b in the tire 123b, it is also preferable if the field of view 601a of the optical camera 601 further capture this visual marker or indicator on the tire 123b. According to the embodiments shown in FIG. 7, the tire fitting system 600 may comprise, be arranged to be connected to, or be configured to communicate with a tire sensor receiver 606. The tire sensor receiver 606 may be configured to receive or read tire sensor signals transmitted from tire sensors in a tire of a wheel, such as, e.g. from the tire sensor 121b. The tire sensor receiver 606 may be a TPMS/THS system receiver in case the tire sensor 121b is a TPMS/THS sensor. The tire sensor receiver 606 may comprise an antenna 606a for receiving a tire sensor signal from tire sensor 121b. As shown in FIG. 7, this case is advantageous in case the tire sensor 121b is located at the same location as the location for the air valve 125 on the rim 124b, e.g. the opening 125a. This may be a default setting for the wheel 120*b*. In this case, the air valve 123 may screwed into, or together with, the tire sensor 121. In this case, this information may thus be used to determine the location for the air valve 125 on the rim 124*b*. Here, it should also be noted that the tire signal from the tire sensor 121*b* may be sent when the tire 123*b* is inflated on the rim 124*b* and thus activated, or when the tire sensor 121*b* is activated by low-frequency actuator (not shown).

Optionally, the tire fitting system 600 may also comprise, be arranged to be connected to, or be configured to communicate with an RFID scanner 602, i.e. a RFID scanning apparatus. The RFID scanner 602 may be configured to scan for RFID tags, such as, the RFID tag 122*b* on the tire 123*b*. The RFID scanner 602 may comprise an antenna 603 for transmitting an RFID signal, e.g. an RFID interrogation signal, towards the RFID tag 122*b*. As the RFID tag 122*b* receives the RFID signal from the RFID scanner 602, the RFID tag 122*b* will respond with a signal comprising the identity of the RFID tag. The RFID scanner 602 may thus receive a response signal from the RFID tag 122*b* receiving its transmitted RFID signal. According to some embodiments, the tire fitting system 600 may also comprise, be arranged to be connected to, or be configured to communicate with an automation system 604 and/or a display 605.

The tire fitting system 600 comprise a processing circuitry 610 and a memory 620. It should also be noted that some or all of the functionality described in the embodiments herein as being performed by the tire fitting system 600 may be provided by the processing circuitry 610 executing instructions stored on a computer-readable medium, such as, the memory 620 shown in FIG. 6. For example, the processing circuitry 610 may be configured to communicate with the optical camera 601 and receive and process images of the tire 123*b* and the rim 124*b* of the wheel 120*b* from the optical camera 601. The processing circuitry 610 may also be configured to be communicate with the RFID scanner 602 and receive and process information indicating the location of the RFID tag 122*b* on the tire 123*b*. The processing circuitry 610 may further be arranged to communicate with the automation system 604 and/or display 605. Furthermore, the processing circuitry 310 may further comprise additional components, such as, for example, a determining module 611 and a providing module 612, each responsible for providing its functionality to support the embodiments described herein.

The tire fitting system 600 or processing circuitry 610 is configured to, or may comprise the determining module 611 configured to, determine a location of an Radio Frequency Identification, RFID, tag 122*b* on the tire 123*b* of the wheel 120*b*. Also, the tire fitting system 600 or processing circuitry 610 is configured to, or may comprise the determining module 611 configured to, determine a location for an air valve 125 on the rim 124*b* of the wheel 120*b*. Further, the tire fitting system 600 or processing circuitry 610 is configured to, or may comprise the determining module 611 configured to, determine the distance between the location of the RFID tag 122*b* and the location for the air valve 125 on the rim 124*b*. Moreover, the tire fitting system 600 or processing circuitry 610 is configured to, or may comprise the providing module 612 configured to, provide instructions for aligning the tire 123*b* on the rim 124*b* based on the determined distance between the location of the RFID tag 122*b* and the location for the air valve 125 on the rim 124*b*.

In some embodiments, the tire fitting system 600 or processing circuitry 610 may be configured to, or may comprise the providing module 612 configured to, provide the instructions to an automation system arranged to physically fit the tire 123*b* on the rim 124*b* of the wheel 120*b*.

In some embodiments, the tire fitting system 600 or processing circuitry 610 may be configured to, or may comprise the providing module 612 configured to, display the instructions for aligning the tire 123*b* on the rim 124*b* on a display 605. In this case, according to some embodiments, the tire fitting system 600 or processing circuitry 610 may be configured to, or may comprise the providing module 612 configured to, display the instructions for aligning the tire 123*b* on the rim 124*b* of the wheel 120*b* on the display 605 until the distance between the location of the RFID tag 122*b* and the location for the air valve 125 is at or below a determined threshold level. Further, according to some embodiments, the tire fitting system 600 or processing circuitry 610 may be configured to, or may comprise the providing module 612 configured to, display information indicating that the alignment of the tire 123*b* on the rim 124*b* of the wheel 120*b* is complete on the display 605 when the distance between the location of the RFID tag 122*b* and the location for the air valve 125 is at or below the determined threshold level.

In some embodiments, the tire fitting system 600 or processing circuitry 610 may be configured to, or may comprise the determining module 611 configured to, determine the location of the RFID tag 122*b* on the tire 123*b* of the wheel 120*b* by performing image processing on images of the tire 123*b* from the optical camera 601 or by using an RFID scanning apparatus 602. Optionally, in some embodiments, the tire fitting system 600 or processing circuitry 610 may be configured to, or may comprise the determining module 611 configured to, determine the location for an air valve 125 on the rim 124*b* of the wheel 120*b* by performing image processing on images of the rim 124*b* from an optical camera 601 or by using a tire sensor receiver 606.

Furthermore, the embodiments for for assisting in fitting a tire 123*b* on a rim 124*b* of a wheel 120*b* prior to assembly of the wheel 120*b* on a vehicle 100 described above may be at least partly implemented through one or more processors, such as, the processing circuitry 610 in the tire fitting system 600 depicted in FIG. 6, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 610 in the tire fitting system 600. The data carrier, or computer readable medium, may be one of an electronic signal, optical signal, radio signal or computer-readable storage medium. The computer program code may e.g. be provided as pure program code in the tire fitting system 600 or on a server and downloaded to the tire fitting system 600. Thus, it should be noted that the tire fitting system 600 may in some embodiments be implemented as computer programs stored in memory 620 in FIG. 6, e.g. the computer readable storage unit/module, for execution by processors or processing modules, e.g. the processing circuitry 610 in the tire fitting system 600 in FIG. 6.

Those skilled in the art will also appreciate that the processing circuitry 610 and the memory 620 described above may refer to a combination of analog and digital circuits, and/or one or more processors configured with software and/or firmware, e.g. stored in a computer readable storage unit/module, that when executed by the one or more processors such as the processing circuitry 610 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 8:
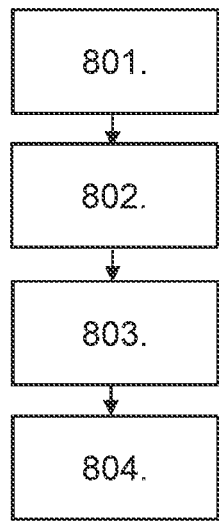
FIG. 8 is a flowchart illustrating embodiments of a method in a tire fitting system.

Examples of embodiments of a method performed by a tire fitting system 600 for assisting in fitting a tire 123*b* on a rim 124*b* of a wheel 120*b* prior to assembly of the wheel 110 on a vehicle 100, will now be described with reference to the flowchart depicted in FIG. 8. FIG. 8 is an illustrated example of actions, steps or operations which may be performed a tire fitting system 600 described below with reference to FIGS. 6-7. The method may comprise the following actions, steps or operations.

Action 801. The tire fitting system 600 determines a location of a Radio Frequency Identification, RFID, tag 122*b* in the tire 123*b* of the wheel 120*b*. This may, for example, be performed by the tire fitting system 600 as the tire 123*b* is to be fitted onto the rim 124*b* of the wheel 120*b*. According to one example, the tire fitting system 600 may determine the location of the RFID tag 122*b* on the tire 123*b* of the wheel 120*b* by performing image processing on images of the tire 123*b* from an optical camera 601. This means that as the tire 123*b* to be fitted onto the rim 124*b* of the wheel 120*b* appears in the field of view 601*a* of the optical camera 601, the tire fitting system 600 may, based on images of the tire 123*b* from the optical camera 601, determine the location of the RFID tag 122*b* on the tire 123*b* of the wheel 120*b*. This may be advantageous in cases when the tire 123*b* comprise a visual marker or indicator on the outside of the tire 123*b* indicating the location of the RFID tag 122*b* in the tire 123*b*.

According to another example, the tire fitting system 600 may determine the location of the RFID tag 122*b* on the tire 123*b* of the wheel 120*b* by using an RFID scanning apparatus 602. This means that the tire fitting system 600 may use the RFID scanning apparatus or scanner 602 in order to scan the tire 123*b* for the RFID tag 122*b*. As the RFID scanner 602 scans an area on the tire 123*b* comprising the RFID tag 122*b*, the RFID tag 122*b* will respond with a RFID transmission comprising the identity of the RFID tag 122*b* which may be read by the RFID scanner 602. Thus, based on RFID transmission of the RFID tag 122*b*, the tire fitting system 600 may determine the location of the RFID tag 122*b* on the tire 123*b*. The tire fitting system 600 may, for example, use sequential scanning of areas of the tire 123*b* to determine the location of the RFID tag 122*b* on the tire 123*b*. Optionally, the tire fitting system 600 may use the receiving direction and/or signal strength of the RFID transmission to determine the location of the RFID tag 122*b* on the tire 123*b*.

Action 802. The tire fitting system 600 determines a location for an air valve 125 on the rim 124*b* of the wheel 120*b*. According to one example, the tire fitting system 600 may determine the location for an air valve 125 on the rim 124*b* of the wheel 120*b* by performing image processing on images of the rim 124*b* from an optical camera 601. This means that as the rim 124*b* onto which the tire 123*b* is to be fitted appears in the field of view 601*a* of the optical camera 601, the tire fitting system 600 may, based on images of the rim 124*b* from the optical camera 601, determine the location for an air valve 125 on the rim 124*b*. The location for an air valve 125 on the rim 124*b* may, for example, be the opening 125*a* on the rim 124*b* illustrated in FIG. 5. Here, it should be noted that image object identification in digital camera images is known in the prior art and commonly implemented for various different implementations. Therefore, this subject is not discussed in more detail herein.

According to one example, the tire fitting system 600 may determine the location for an air valve 125 on the rim 124*b* of the wheel 120*b* by using a tire sensor receiver 606. This means that in case in case a tire sensor 121*b* is located at the same location as the location for the air valve 125 on the rim 124*b*, this information may thus be used to determine the location for the air valve 125 on the rim 124*b*.

Action 803. As the location of the RFID tag 122*b* in the tire 123*b* and the location for an air valve 125 on the rim 124*b* has been determined in Actions 801-802, the tire fitting system 600 determines the distance between the location of RFID tag 122*b* and the location for the air valve 125 on the rim 124*b*. This means that the tire fitting system 600 may determine if, and may also how, the tire 123*b* or the rim 124*b* should be repositioned relative to each other in order to ensure an advantageous location of the RFID tag 122*b*. For example, in case the determined distance between the location of RFID tag 122*b* and the location for the air valve 125 on the rim 124*b* is at or above a determined threshold value, the tire fitting system 600 may determine that the tire 123*b* or the rim 124*b* should be repositioned or aligned relative to each other and how this should be performed, e.g. by rotating the tire 123*b* and/or the rim 124*b* such that the distance between the location of RFID tag 122*b* and the location for the air valve 125 on the rim 124*b* is reduced to or below the determined threshold value. If the determined distance between the location of RFID tag 122*b* and the location for the air valve 125 on the rim 124*b* is at or below the determined threshold value from the start, the tire fitting system 600 may also determine that no repositioning or alignment of the tire 123*b* or rim 124*b* is necessary.

Action 804. After determining the distance in Action 803, the tire fitting system 600 provides instructions for aligning the tire 123*b* on the rim 124*b* based on the determined distance between the RFID tag 122*b* and the location for the air valve 125 on the rim 124*b*. In other words, the tire fitting system 600 may determine and provide instructions on how the tire 123*b* and/or the rim 124*b* should be repositioned or aligned relative to each other in order to ensure a favorable distance between the RFID tag 122*b* and the location for the air valve 125 on the rim 124*b*, i.e. a distance that is shorter than a determined threshold value.

According to some embodiments, the instructions may be provided to an automation system 604 arranged to physically fit the tire 123*b* on the rim 124*b* of the wheel 120*b*. For example, the tire fitting system 600 may transmit control signals to the automation system 604 comprising the instructions for aligning the tire 123*b* on the rim 124*b*. The automation system 604 may then, for example, control one or more robotic arms or mechanisms that controls the position of the tire 123*b* relative to the rim 124*b* in accordance with the receive control signals and instructions. In this way, the tire fitting system 600 may ensure that the tire 123*b* will always fitted on the rim 124*b* operate in a manner that aligns the RFID tag 122*b* of the tire 123*b* with the location for the air valve 125 on the rim 124*b*.

Figure 9:
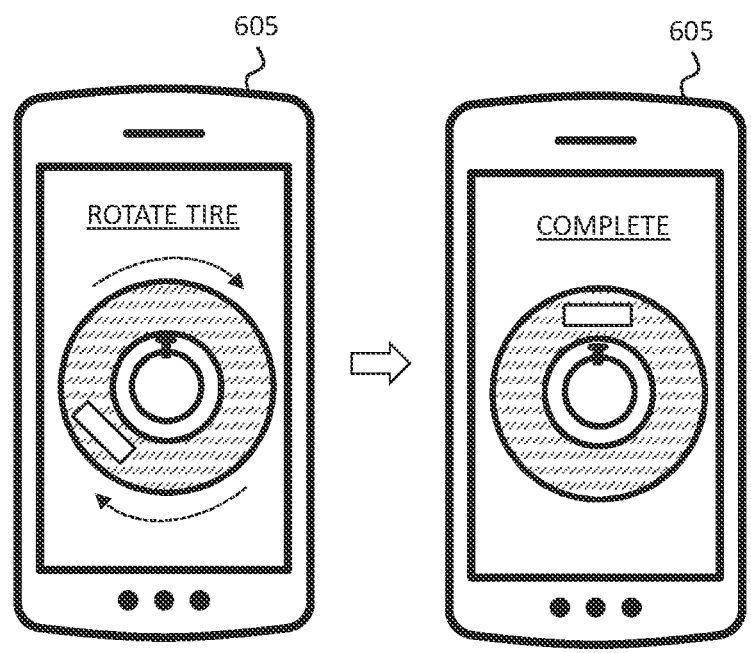
FIG. 9 is a schematic illustration of a display displaying information according to some embodiments.

Optionally, according to some embodiments, the tire fitting system 600 may provide the instructions by displaying the instructions for aligning the tire 123*b* on the rim 124*b* of the wheel 120*b* on a display 605. This means that the tire fitting system 600 may control information being displayed on the display 605 such that the information indicates how the tire 123*b* and/or the rim 124*b* should be aligned in regards to each other, e.g. to an operator of the tire fitting system 600. In some embodiments, the tire fitting system 600 may display the instructions for aligning the tire 123*b* on the rim 124*b* of the wheel 120*b* on the display 605 until the distance between the location of the RFID tag 122b and the location for the air valve 125 is at or below a determined threshold level. This means that the tire fitting system 600 may control information being displayed on the display 605 such that the information persistently indicates how the tire 123b and/or the rim 124b should be aligned in regards to each other during the alignment or repositioning of the tire 123b and/or the rim 124b. This is exemplified by the display 605 in FIG. 9 (left). Furthermore, in some embodiments, the tire fitting system 600 may display information indicating that the alignment of the tire 123b on the rim 124b of the wheel 120b is complete on the display 605 when the distance between the location of the RFID tag 122b and the location for the air valve 125 is at or below the determined threshold level. This means that the tire fitting system 600 may control information being displayed on the display 605 such that the information indicates when a proper alignment of the tire 123b and the rim 124b has been achieved. This is exemplified by the display 605 in FIG. 9 (right).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatuses, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

The invention claimed is:

1. A method performed by a tire fitting system for assisting in fitting a tire on a rim of a wheel prior to assembly of the wheel on a vehicle, wherein the method comprises:
   determining a location of a Radio Frequency Identification, RFID, tag on the tire of the wheel;
   determining a location for an air valve on the rim of the wheel;
   determining the distance between the location of the RFID tag and the location for the air valve on the rim; and
   providing instructions for aligning the tire on the rim based on the determined distance between the location of the RFID tag and the location for the air valve on the rim.

2. The method according to claim 1, wherein the instructions is provided to an automation system arranged to physically fit the tire on the rim of the wheel.

3. The method according to claim 1, wherein the providing comprise displaying the instructions for aligning the tire on the rim of the wheel on a display.

4. The method according to claim 3, further comprising displaying the instructions for aligning the tire on the rim of the wheel on the display until the distance between the location of the RFID tag and the location for the air valve is at or below a determined threshold level.

5. The method according to claim 3, further comprising displaying information indicating that the alignment of the tire on the rim of the wheel is complete on the display when the distance between the location of the RFID tag and the location for the air valve is at or below the determined threshold level.

6. The method according to claim 1, further comprising determining the location of the RFID tag on the tire of the wheel by performing image processing on images of the tire from the optical camera or by using an RFID scanning apparatus.

7. The method according to claim 1, further comprising determining the location for an air valve on the rim of the wheel by performing image processing on images of the rim from an optical camera or by using a tire sensor receiver.

8. A tire fitting system for assisting in fitting a tire on a rim of a wheel prior to assembly of the wheel on a vehicle, the tire fitting system comprising a processing circuitry configured to
   determine a location of a Radio Frequency Identification, RFID, tag on the tire of the wheel, determine a location for an air valve on the rim of the wheel, determine the distance between the location of the RFID tag and the location for the air valve on the rim, and provide instructions for aligning the tire on the rim based on the determined distance between the location of the RFID tag and the location for the air valve on the rim.

9. The tire fitting system according to claim 8, wherein the processing circuitry is further configured to provide the instructions to an automation system arranged to physically fit the tire on the rim of the wheel.

10. The tire fitting system according to claim 8, wherein the processing circuitry is further configured to display the instructions for aligning the tire on the rim on a display.

11. The tire fitting system according to claim 10, wherein the processing circuitry is further configured to display the instructions for aligning the tire on the rim of the wheel on the display until the distance between the location of the RFID tag and the location for the air valve is at or below a determined threshold level.

12. The tire fitting system according to claim 10, wherein the processing circuitry is further configured to display information indicating that the alignment of the tire on the rim of the wheel is complete on the display when the distance between the location of the RFID tag and the location for the air valve is at or below the determined threshold level.

13. The tire fitting system according to claim 8, wherein the processing circuitry is further configured to determine the location of the RFID tag on the tire of the wheel by performing image processing on images of the tire from the optical camera or by using an RFID scanning apparatus.

14. The tire fitting system according to claim 8, wherein the processing circuitry is further configured to determine the location for an air valve on the rim of the wheel by performing image processing on images of the rim from an optical camera or by using a tire sensor receiver.

15. A computer program product comprising program code for performing the steps of claim 1 when said program code is run on a computer or on processing circuitry of a tire fitting system.

16. A computer program carrier carrying a computer program according to claim 15, wherein the computer program carrier is one of a computer-readable storage medium.

* * * * *